Oct. 16, 1923.

D. W. MAUPIN ET AL

PIPE COUPLER

Filed Dec. 20, 1922

1,471,045

Inventor
D. W. Maupin
and R. C. Teegarden
By Mason Fenwick & Lawrence
Attorneys

Patented Oct. 16, 1923.

1,471,045

UNITED STATES PATENT OFFICE.

DEXTER WOODSON MAUPIN AND RAYMOND CLIFFORD TEEGARDEN, OF BOULDER, COLORADO.

PIPE COUPLER.

Application filed December 20, 1922. Serial No. 608,042.

*To all whom it may concern:*

Be it known that we, DEXTER W. MAUPIN and RAYMOND C. TEEGARDEN, citizens of the United States, residing at Boulder, in the county of Boulder and State of Colorado, have invented certain new and useful Improvements in Pipe Couplers; and we do hereby declare the following to a full, clear, and exact description of the invention, such as will enable others skilled in the art to which it appertains to make and use the same.

This invention relates to an improved coupling device for pipes.

The object of the present invention is to provide a device of the character indicated for any and all kinds of rods or pipes, requiring no washers or packing, and supplying its own give and take, thereby doing away with the left hand thread entirely.

The invention consists in the novel construction, arrangement and combinations of parts as hereinafter more particularly described and claimed.

One sheet of drawings accompanies this specification as part thereof in which like reference characters refer to similar parts throughout.

Figure 1:
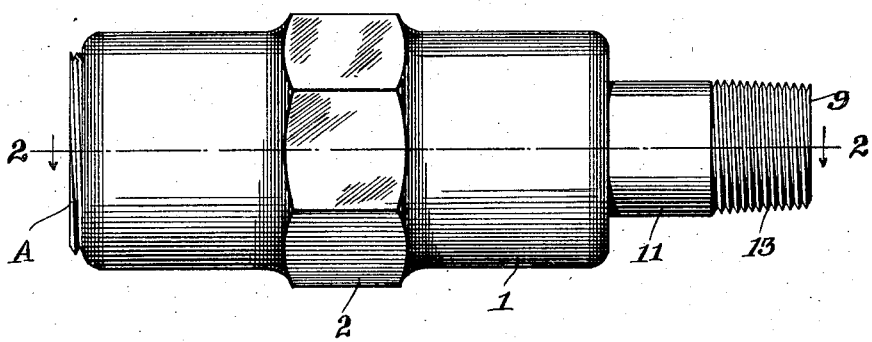
Figure 1 is a side elevation of the improved coupling.

The improved coupling consists of a sleeve part 1 provided with a plurality of angularly disposed faces 2 adapted to seat a wrench or similar tool and further provided with a restricted bore 6 adjacent one end and an enlarged bore 12 extending throughout the greater part of its length said sleeve being tapered and interiorly threaded intermediate the reduced bore 6 and the enlarged bore 12 as at 8 and said sleeve being further provided adjacent its other end with a tapered interiorly threaded bore part 3.

An interior tubular member 9 is provided having an enlarged cylindrical part 10 adapted to co-mate in snug sliding engagement with the enlarged bore 12 of the sleeve part and is further provided with a reduced cylindrical portion 11 adapted to co-mate in snug sliding relation with the reduced bore 6 of the sleeve member. The interior tubular member is tapered intermediate the enlarged and reduced portions and exteriorly threaded as at 7 said threads being adapted to co-mate with the interior threads 8 of the sleeve part. The end of the reduced portion 11 of the interior tubular member 9 is tapered and exteriorly threaded as at 13.

A tapering bushing A is provided having exterior threads adapted to co-mate with the interior threads 3 of the sleeve part and having its bore tapered and exteriorly threaded as at 5.

The parts are so proportioned that the enlarged bore part 12 of the sleeve is substantially the length of the enlarged cylindrical part 10 of the interior member plus the length of the tapered exteriorly threaded part 7 of said member.

Figure 2:
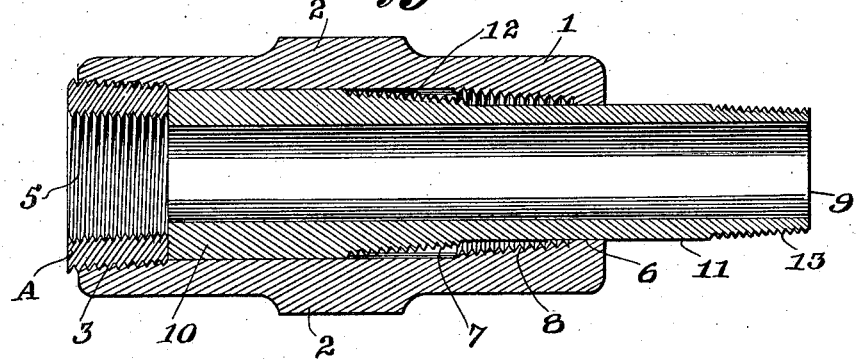
Fig. 2 is a longitudinal sectional view taken on the line 2—2 of Fig. 1.

In use the interior member is screwed back into the sleeve as is illustrated in Fig. 2. The coupling can then be fitted into a pipe system by removing a portion of pipe of a length equal to the length of the fitting and threading both of the adjacent ends of pipe in the usual manner with an ordinary right hand threaded die. An ordinary coupler is then secured to one pipe end which will receive the tapered and exteriorly threaded end 13 of the interior member while the threaded end of the other pipe will be received into bushing A. The interior tubular member will tighten simultaneously into the union and into the tapered threaded part 8 of the sleeve forming a tight joint without the use of washers or gaskets.

Having thus fully described our invention, we claim:

1. A coupling comprising a sleeve having a cylindrical bore bearing intermediate its ends, a second cylindrical bore bearing of less diameter than the first mentioned adjacent one end and a tapered threaded bore connecting said bearing bores, and a slidable tubular member having a part adjacent one end adapted to fit snugly in said intermediate bore bearing and a part of lesser diameter adapted to fit snugly in the terminal bore bearing of the sleeve, said tubular member being tapered and exteriorly threaded intermediate said two parts to mate with the tapered threaded part of the sleeve and being further provided adjacent its end with a tapered threaded part adapted to co-act with an ordinary pipe coupler.

2. A device as described in claim one with a bushing in the end of the sleeve opposite the reduced bearing bore and in which the enlarged bearing bore of the sleeve intermediate the bushing and the tapered threaded part is of a length substantially equal to the length of the larger bearing part of the slidable member plus the length of its tapered and threaded part.

In testimony whereof we affix our signatures.

DEXTER WOODSON MAUPIN.
RAYMOND CLIFFORD TEEGARDEN.